(12) United States Patent
Henry et al.

(10) Patent No.: US 9,970,490 B2
(45) Date of Patent: May 15, 2018

(54) AGRICULTURAL METERING SYSTEM HAVING A MAGNETORHEOLOGICAL FLUID CLUTCH ASSEMBLY

(71) Applicant: CNH Industrial Canada, Ltd., Saskatoon (CA)

(72) Inventors: James Wayne Henry, Saskatoon (CA); Scott David Noble, Saskatoon (CA)

(73) Assignee: CNH Industrial Canada, Ltd., Saskatoon, Saskatchewan (CA)

(*) Notice: Subject to any disclaimer, the term of this patent is extended or adjusted under 35 U.S.C. 154(b) by 47 days.

(21) Appl. No.: 14/841,427

(22) Filed: Aug. 31, 2015

(65) Prior Publication Data
US 2017/0055435 A1    Mar. 2, 2017

(51) Int. Cl.
| | |
|---|---|
| A01C 7/04 | (2006.01) |
| F16D 37/02 | (2006.01) |
| A01C 7/08 | (2006.01) |
| A01C 7/12 | (2006.01) |

(52) U.S. Cl.
CPC ............ *F16D 37/02* (2013.01); *A01C 7/081* (2013.01); *A01C 7/12* (2013.01)

(58) Field of Classification Search
CPC ............ A01C 7/081; A01C 7/12; F16D 37/02
See application file for complete search history.

(56) References Cited

U.S. PATENT DOCUMENTS

| | | | |
|---|---|---|---|
| 5,078,066 A | 1/1992 | Lafferty | |
| 5,816,372 A | 10/1998 | Carlson et al. | |
| 6,102,827 A * | 8/2000 | Teasdale | F16D 37/02 192/21.5 |
| 6,240,861 B1 | 6/2001 | Memory | |
| 7,467,697 B2 | 12/2008 | Elie et al. | |
| 7,571,688 B1 | 8/2009 | Friestad et al. | |
| 8,196,534 B2 | 6/2012 | Meyer et al. | |
| 8,307,771 B2 | 11/2012 | Cannon et al. | |
| 8,371,238 B2 | 2/2013 | Dean et al. | |
| 2002/0178981 A1 | 12/2002 | Drummond et al. | |
| 2007/0080036 A1 * | 4/2007 | Elie | F16D 27/06 192/21.5 |

(Continued)

OTHER PUBLICATIONS

Bourgault North America, 2115 Air Seeder, http://www.bourgault.com/SearchProduct/ViewProduct/tabid/168/docid/681/IsSearch/false/New/true/model/1/language/en-US/Default.aspx., accessed Aug. 19, 2014, 2 pages.

(Continued)

*Primary Examiner* — J. Casimer Jacyna
(74) *Attorney, Agent, or Firm* — Rebecca L. Henkel; Rickard K. DeMille (57) ABSTRACT

An agricultural metering system includes a meter roller having multiple flutes and recesses, in which the meter roller is configured to meter product from an agricultural product storage compartment to a product distribution system via rotation of the meter roller. The agricultural metering system also includes a shaft configured to drive the meter roller to rotate, and a clutch assembly operatively coupled to the meter roller. The clutch assembly includes a magnetorheological (MR) fluid, a rotation rate of the meter roller is at least partially dependent on an effective viscosity of the MR fluid, and the effective viscosity of the MR fluid is controllable based at least in part on an effective magnitude of a magnetic field applied to the MR fluid.

11 Claims, 3 Drawing Sheets

(56) References Cited

U.S. PATENT DOCUMENTS

2009/0057350 A1* 3/2009 Lin .................... A01C 7/12
 222/636
2012/0048670 A1 3/2012 Smith et al.
2014/0158204 A1* 6/2014 Thompson .............. A01C 7/04
 137/1

OTHER PUBLICATIONS

Mid-Atlantic Rubber Co., RD-8058-1—12 Nm TFD Device, accessed Aug. 19, 2014, 2 pages.

* cited by examiner

AGRICULTURAL METERING SYSTEM HAVING A MAGNETORHEOLOGICAL FLUID CLUTCH ASSEMBLY

BACKGROUND

The invention relates generally to an agricultural metering system having a magnetorheological fluid clutch assembly.

Generally, seeding implements (e.g., seeders) are towed behind a tractor or other work vehicle via a mounting bracket secured to a rigid frame of the implement. Seeding implements typically include multiple row units distributed across a width of the implement. Each row unit is configured to deposit seeds at a desired depth beneath the soil surface of a field, thereby establishing rows of planted seeds. For example, each row unit typically includes a ground engaging tool or opener that forms a seeding path (e.g., trench) for seed deposition into the soil. The opener is followed by a seed tube configured to direct seeds and/or other agricultural products (e.g., fertilizer, etc.) into the trench. Closing discs may be positioned behind the seed tube for moving the soil back into the trench, and/or a packer wheel may be coupled to a rear portion of the row unit to pack the soil on top of the deposited seeds.

In certain configurations, an air cart is used to meter and deliver agricultural product (e.g., seeds, fertilizer, etc.) to the row units of the seeding implement. The air cart generally includes a seed storage tank, an air source (e.g., a blower), and a metering system. The product is typically gravity fed from the storage tank to the metering system, which distributes a desired volume of product into an air flow generated by the air source. The air flow carries the product to the row units via conduits extending between the air cart and the seeding implement. The metering system typically includes meter rollers that regulate the flow of product based on meter roller geometry and rotation rate. For example, certain meter rollers include one or more independently controllable meter roller segments. Each meter roller segment may be configured to meter agricultural product to row units within a respective portion of the implement. Unfortunately, the mechanisms configured to facilitate control of the meter roller and/or independent control of the meter roller segments may be complex and costly to manufacture and/or to maintain.

BRIEF DESCRIPTION

In one embodiment, an agricultural metering system includes a meter roller having multiple flutes and recesses, in which the meter roller is configured to meter product from an agricultural product storage compartment to a product distribution system via rotation of the meter roller. The agricultural metering system also includes a shaft configured to drive the meter roller to rotate, and a clutch assembly operatively coupled to the meter roller. The clutch assembly includes a magnetorheological (MR) fluid, a rotation rate of the meter roller is at least partially dependent on an effective viscosity of the MR fluid, and the effective viscosity of the MR fluid is controllable based at least in part on an effective magnitude of a magnetic field applied to the MR fluid.

In another embodiment, an agricultural metering system includes a meter roller having multiple flutes and recesses, in which the meter roller is configured to meter product from an agricultural product storage compartment to a product distribution system via rotation of the meter roller. The agricultural metering system also includes a shaft configured to drive the meter roller to rotate, and a clutch assembly having a magnetorheological (MR) fluid disposed between an inner surface of the meter roller and an outer surface of the shaft. A rotation rate of the meter roller relative to the shaft is at least partially dependent on an effective viscosity of the MR fluid, and the effective viscosity of the MR fluid is controllable based at least in part on an effective magnitude of a magnetic field applied to the MR fluid.

In a further embodiment, an agricultural metering system includes a meter roller having multiple flutes and recesses, in which the meter roller is configured to meter product from an agricultural product storage compartment to a product distribution system via rotation of the meter roller. The agricultural metering system also includes a shaft configured to drive the meter roller to rotate, in which the shaft is configured to rotate relative to a base. In addition, the agricultural metering system includes a clutch assembly having a magnetorheological (MR) fluid disposed between an outer surface of the shaft and an inner surface of the base. A rotation rate of the shaft is at least partially dependent on an effective viscosity of the MR fluid, and the effective viscosity of the MR fluid is controllable based at least in part on an effective magnitude of a magnetic field applied to the MR fluid.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
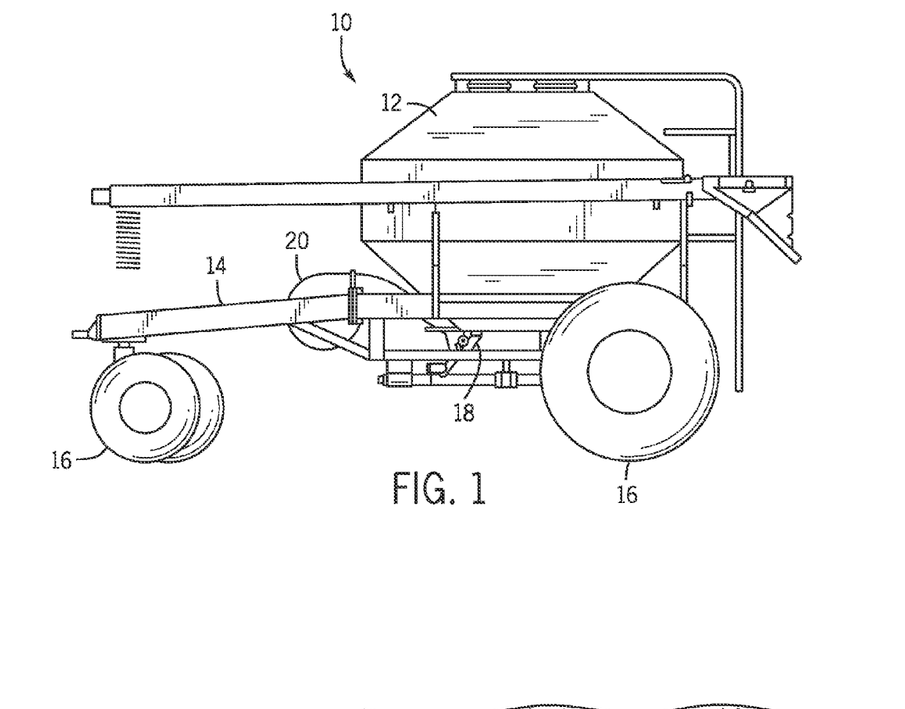
FIG. 1 is a side view of an embodiment of an air cart, including a metering system configured to regulate a flow of particulate material.

Turning now to the drawings, FIG. 1 is a side view of an air cart 10 that may be used in conjunction with a towable agricultural implement to deposit seeds into soil. For example, certain agricultural implements include row units configured to open the soil, dispense seeds into the soil opening, and re-close the soil as the implement moves through a field. Such implements are generally coupled to a tow vehicle, such as a tractor, and pulled through the field. In certain configurations, seeds are conveyed to the row units by the illustrated air cart 10, which is generally towed in sequence with the implement. In alternative configurations, the air cart 10 may be configured to provide fertilizer to the row units, or a combination of seeds and fertilizer, among other agricultural products.

In the illustrated embodiment, the air cart 10 includes a storage tank 12, a frame 14, wheels 16, a metering system 18 and an air source 20. In certain configurations, the storage tank 12 includes multiple compartments for storing various flowable particulate materials. For example, one compartment may include seeds, such as canola or mustard, and another compartment may include a dry fertilizer. In such configurations, the air cart 10 is configured to delivery both the seeds and fertilizer to the implement. The frame 14 includes a towing hitch configured to couple to the implement or tow vehicle. As discussed in detail below, seeds and/or fertilizer within the storage tank 12 are gravity fed into the metering system 18. The metering system 18 includes at least one meter roller that regulates the flow of material from the storage tank 12 into an air flow provided by the air source 20. The air flow then carries the material to row units of the implement by pneumatic conduits. In this manner, the row units receive a supply of seeds and/or fertilizer for deposition within the soil.

Figure 2:
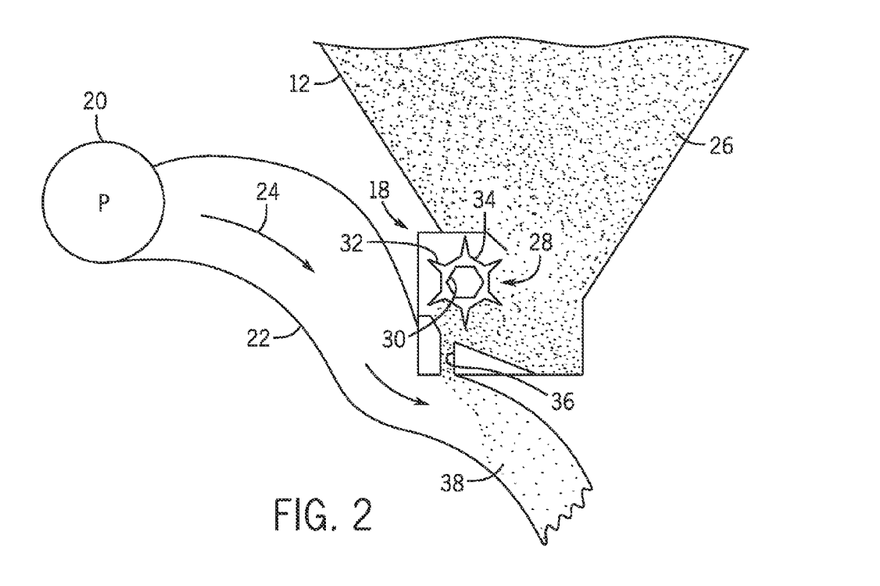
FIG. 2 is a schematic view of an embodiment of a metering system that may be employed within the air cart of FIG. 1.

FIG. 2 is a schematic view of a metering system 18 that may be employed within the air cart of FIG. 1. As illustrated, the air source 20 is coupled to a conduit 22 configured to flow air 24 past the metering system 18. The air source 20 may be a pump or blower powered by an electric or hydraulic motor, for example. Flowable particulate material 26 (e.g., seeds, fertilizer, etc.) within the storage tank 12 flows by gravity and/or air pressure (e.g., via a pressurized tank 12) into the system 18. The metering system 18 includes one or more meter rollers 28 configured to regulate the flow of material 26 into the air flow 24. For example, the metering system 18 may include multiple meter rollers 28 disposed adjacent to one another along a longitudinal axis of the rollers 28. For example, certain metering assemblies 18 may include 1, 2, 3, 4, 5, or 6 meter roller, or more.

As illustrated, the meter roller 28 includes an interior cavity 30 configured to receive a shaft that drives the meter roller 28. In the illustrated embodiment, the cavity 30 has a hexagonal cross section. However, alternative embodiments may include various other cavity configurations (e.g., triangular, square, keyed, splined, etc.). The shaft is coupled to a drive system, such as an electric or hydraulic motor, configured to rotate the meter roller 28. Alternatively, the meter roller 28 may be coupled to a wheel 16 by a gear assembly such that rotation of the wheel 16 drives the meter roller 28 to rotate. Such a configuration automatically varies the rotation rate of the meter roller 28 based on the speed of the air cart 10.

As illustrated, the meter roller 28 includes multiple flutes 32 and recesses 34. The number and geometry of the flutes 32 are particularly configured to accommodate the material 26 being distributed. The illustrated meter roller 28 includes six flutes 32 and a corresponding number of recesses 34. Alternative meter rollers may include more or fewer flutes 32 and/or recesses 34. For example, the meter roller 28 may include 2, 4, 6, 8, 10, 12, 14, 16, 18, 20, or more flutes 32 and/or recesses 34. In addition, the depth of the recesses 34 and/or the height of the flutes 32 are configured to accommodate the material 26 within the storage tank 12. For example, a meter roller 28 having deeper recesses 34 and fewer flutes 32 may be employed for larger seeds, while a meter roller 28 having shallower recesses 34 and more flutes 32 may be employed for smaller seeds. Other parameters such as flute pitch (i.e., angle of the flute relative to a longitudinal/rotational axis) and flute angle (i.e., angle of the flute relative to a radial axis) may also be particularly selected to accommodate the material 26.

For a particular meter roller configuration, the rotation rate of the meter roller 28 controls the flow of material 26 into the air stream 24. For example, as the meter roller 28 rotates, material is transferred through an opening 36 in the metering system 18 into the conduit 22. The material then mixes with air from the air source 20, thereby forming an air/material mixture 38. The mixture then flows to the row units of the implement via pneumatic conduits of a product distribution system. The row units deposit the seeds and/or fertilizer within the soil as the implement travels across the field.

Certain meter rollers include one or more independently controllable meter roller segments. Each meter roller segment may be configured to meter agricultural product to row units within a respective portion of the implement. Unfortunately, the mechanisms (e.g., mechanical clutches, etc.) configured to facilitate control of the meter roller and/or independent control of the meter roller segments may be complex and costly to manufacture and/or to maintain. In addition, the power (e.g., electrical power, hydraulic power, etc.) utilized to operate the control mechanism(s) may reduce the efficiently of the air art.

As discussed in detail below, the metering system of certain embodiments disclosed herein includes a magnetorheological (MR) fluid clutch assembly, which may reduce the complexity and the cost of manufacturing and/or maintaining an air cart, as compared to metering systems that employ mechanical clutches. For example, in certain embodiments, an agricultural metering system includes a meter roller having multiple flutes and recesses. The meter roller is configured to meter product from an agricultural product storage compartment to a product distribution system via rotation of the meter roller. The agricultural metering system also includes a shaft configured to drive the meter roller to rotate. In addition, the agricultural metering system includes a clutch assembly operatively coupled to the meter roller. The clutch assembly includes an MR fluid, a rotation rate of the meter roller is at least partially dependent on an effective viscosity of the MR fluid, and the effective viscosity of the MR fluid is controllable based at least in part on an effective magnitude of a magnetic field applied to the MR fluid. By controlling the effective magnitude of the magnetic field applied to the MR fluid (e.g., via a magnetic field source), the rotation rate of the meter roller, and thus the flow rate of product to the distribution system, may be controlled. In certain embodiments, the meter roller may include multiple segments, and the MR fluid clutch assembly may be configured to independently control the rotation rate of each segment. Employing an MR fluid clutch assembly to control the rotation rate of the meter roller and/or the meter roller segments may utilize less power (e.g., electrical power, hydraulic power, etc.) than a mechanical clutch, thereby increasing the efficiency of the air cart. In addition, the MR fluid clutch assembly may be less complex and/or less costly to manufacture and/or to maintain than a mechanical clutch, thereby reducing manufacturing and/or maintenance costs.

As used herein, effective magnitude may refer to a continuous magnitude of a magnetic field and/or a time-averaged magnitude of a magnetic field (e.g., averaged over 0.1, 0.5, 1, 1.5, 2, 3, 4, or 5 seconds, or more). For example, in certain embodiments, the effective magnitude of the magnetic field may be controlled by a continuous voltage signal. In such embodiments, the effective magnitude of the magnetic field may be adjusted by controlling a magnitude of the continuous voltage signal. In further embodiments, the effective magnitude of the magnetic field may be controlled by a pulse-width modulation (PWM) signal, e.g., in which the magnitude of the signal cyclically varies between a minimum magnitude (e.g., zero magnitude) and a maximum magnitude at a switching frequency. In such embodiments, the magnitude of the magnetic field may vary between a minimum magnitude (e.g., zero magnitude) and a maximum magnitude at the switching frequency. By controlling a duty cycle of the PWM signal (e.g., percentage of time at which the PWM signal is at the maximum magnitude), the effective magnitude (e.g., time-averaged magnitude) of the magnetic field may be adjusted. In certain embodiments, one or more magnetic field sources may be configured to apply a magnetic field having a continuous magnitude and/or a magnetic field having a varying magnitude to the MR fluid.

Furthermore, as used herein, effective viscosity may refer to a substantially constant viscosity of the MR fluid and/or a time-averaged viscosity of the MR fluid (e.g., averaged over 0.1, 0.5, 1, 1.5, 2, 3, 4, or 5 seconds, or more). For example, applying a magnetic field having a continuous magnitude to the MR fluid may induce the MR fluid to have a substantially constant viscosity. Accordingly, the effective viscosity (e.g., substantially constant viscosity) of the MR fluid may be adjusted by varying the effective magnitude (e.g., continuous magnitude) of the magnetic field. In addition, if the viscosity transition time of the MR fluid (e.g., the time sufficient to enable the viscosity of the MR fluid to change in response to a variation in the magnitude of the applied magnetic field) is long relative to the switching frequency of a varying magnitude magnetic field, applying the varying magnitude magnetic field to the MR fluid may also induce the MR fluid to have a substantially constant viscosity. Accordingly, the effective viscosity (e.g., substantially constant viscosity) of the MR fluid may be adjusted by varying the effective magnitude (e.g., time-averaged magnitude) of the magnetic field. However, if the viscosity transition time of the MR fluid is short relative to the switching frequency of the varying magnitude magnetic field, applying the varying magnitude magnetic field to the MR fluid may induce the MR fluid to cyclically change viscosity (e.g., at the switching frequency). For example, the viscosity of the MR fluid may cyclically vary between a low viscosity and a high viscosity at the switching frequency. Accordingly, the effective viscosity (e.g., time-averaged viscosity) of the MR fluid may be adjusted by varying the effective magnitude (e.g., time-averaged magnitude—resulting from control of the duty cycle of the respective PWM signal) of the magnetic field.

Figure 3:
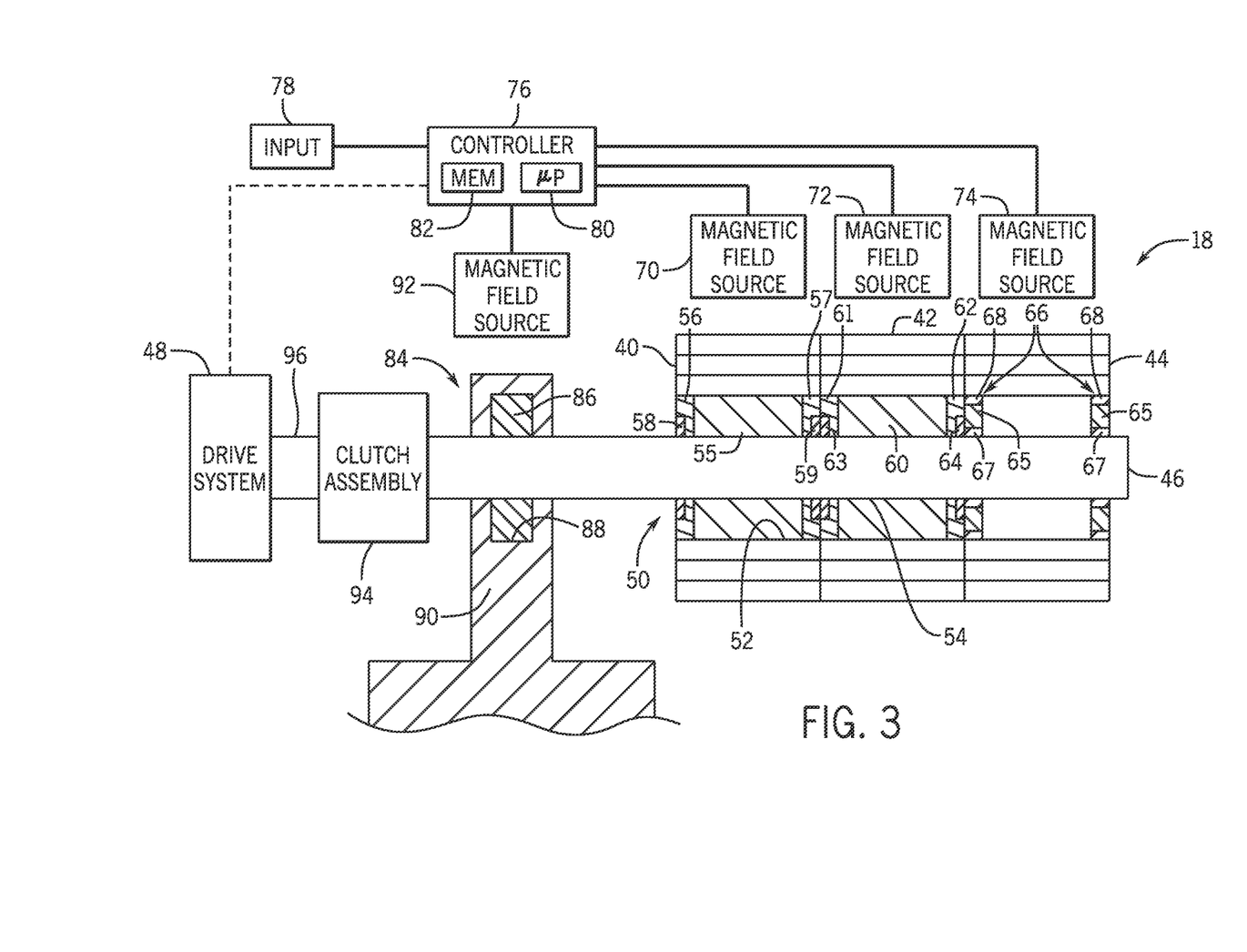
FIG. 3 is a cross-sectional view of a portion of an embodiment of a metering system having a magnetorheological (MR) fluid clutch assembly.

FIG. 3 is a cross-sectional view of a portion of an embodiment of a metering system 18 having a magnetorheological (MR) fluid clutch assembly. In the illustrated embodiment, the metering system 18 includes a meter roller 28 having a first independently controllable segment 40, a second independently controllable segment 42, and a third independently controllable segment 44. Each segment is configured to control output of agricultural product to a respective group of row units. For example, the first segment 40 may output agricultural product to a first header via a first primary distribution line. The first header, in turn, may be coupled to multiple row units on an implement (e.g., on a left portion of the implement) via respective secondary distribution lines. Similarly, the second segment 42 may output agricultural product to respective row units on the implement (e.g., on a center portion of the implement) via a respective primary line, a respective header, and respective secondary lines. In addition, the third segment 44 may output agricultural product to respective row units on the implement (e.g., on a right portion of the implement) via a respective primary line, a respective header, and respective secondary lines. By controlling the rotation rate of each segment, the agricultural product flow rate to each respective group of row units (e.g., on the left, center, and right portions of the implement) may be independently controlled, thereby enhancing distribution of agricultural product throughout the field.

In alternative embodiments, each meter roller segment may be configured to meter a different product (e.g., seed, fertilizer, etc.) into a common distribution system. In such embodiments, individually controlling the rotation rate of each meter roller segment may facilitate delivery of a desire flow rate of each product into the common distribution system. While the illustrated meter roller 28 includes three independently controllable segments, it should be appreciated that alternative embodiments may include more or fewer independently controllable segments. For example, in certain embodiments, the meter roller 28 may include, 1, 2, 3, 4, 5, 6, 7, 8, 9, 10, or more independently controllable segments.

In the illustrated embodiment, each independently controllable segment of the meter roller 28 is driven to rotate by a shaft 46, which in turn, is driven to rotate by a drive system 48. As will be appreciated, the drive system may include an electric motor, a hydraulic motor, or any other suitable drive system. In certain embodiments, the drive system may include a coupling device (e.g., a chain, a belt, etc.) configured to couple the shaft 46 to a wheel of the air cart, such that rotation of the air cart wheel drives the shaft 46 to rotate.

In the illustrated embodiment, the metering system 18 includes a first clutch assembly 50 operatively coupled to the meter roller 28. The clutch assembly 50 includes a magnetorheological (MR) fluid disposed between an inner surface 52 of the meter roller 28 and an outer surface 54 of the shaft 46. As discussed in detail below, a rotation rate of the meter roller/meter roller segments is at least partially dependent on the effective viscosity of the MR fluid, and the effective viscosity of the MR fluid is controllable based at least in part on an effective magnitude of a magnetic field applied to the MR fluid. In the illustrated embodiment, a first MR fluid 55 is disposed between the inner surface 52 of the first segment 40 of the meter roller 28 and the outer surface 54 of the shaft 46. As illustrated, the first MR fluid 55 is contained within a volume defined by the inner surface 52 of the first segment 40, the outer surface 54 of the shaft 46, a first protrusion 56 (e.g., integrally formed with the first segment 40) extending between the inner surface 52 and the outer surface 54 on a first longitudinal end of the first segment 40, and a second protrusion 57 (e.g., integrally formed with the first segment 40) extending between the inner surface 52 and the outer surface 54 on a second longitudinal end of the first segment 40, opposite the first end. In addition, a first seal 58 (e.g., rubber o-ring, polyurethane o-ring, etc.) is positioned proximate to the first protrusion 56, and a second seal 59 (e.g., rubber o-ring, polyurethane o-ring, etc.) is positioned proximate to the second protrusion 57. The seals are configured to block flow of the MR fluid from the volume. In addition, the protrusions are configured to contact the shaft 46 (e.g., via bearing surfaces, bushing surfaces, etc.) to control a radial position of the first segment 40 relative to the shaft. In certain embodiments, at least one of the protrusions includes a longitudinal retaining feature (e.g., ring configured to engage a groove in the shaft 46) to block longitudinal movement of the first segment 40 relative to the shaft.

Furthermore, a second MR fluid 60 is disposed between the inner surface 52 of the second segment 42 of the meter roller 28 and the outer surface 54 of the shaft 46. As illustrated, the second MR fluid 60 is contained within a volume defined by the inner surface 52 of the second segment 42, the outer surface 54 of the shaft 46, a first protrusion 61 (e.g., integrally formed with the second segment 42) extending between the inner surface 52 and the outer surface 54 on a first longitudinal end of the second segment 42, and a second protrusion 62 (e.g., integrally formed with the second segment 42) extending between the inner surface 52 and the outer surface 54 on a second longitudinal end of the second segment 42, opposite the first end. In addition, a first seal 63 (e.g., rubber o-ring, polyurethane o-ring, etc.) is positioned proximate to the first protrusion 61, and a second seal 64 (e.g., rubber o-ring, polyurethane o-ring, etc.) is positioned proximate to the second protrusion 62. The seals are configured to block flow of the MR fluid from the volume. In addition, the protrusions are configured to contact the shaft 46 (e.g., via bearing surfaces, bushing surfaces, etc.) to control a radial position of the second segment 42 relative to the shaft. In certain embodiments, at least one of the protrusions includes a longitudinal retaining feature (e.g., ring configured to engage a groove in the shaft 46) to block longitudinal movement of the second segment 42 relative to the shaft.

Furthermore, a third MR fluid 65 is disposed between the inner surface 52 of the third segment 44 of the meter roller 28 and the outer surface 54 of the shaft 46. As illustrated, the third MR fluid 65 is disposed within two bearings 66. Each bearing 66 includes an inner race 67 rigidly (e.g., non-rotatably) coupled to the shaft 46, and an outer race 68 rigidly (e.g., non-rotatably) coupled to the third segment 44. Each bearing 66 may include one or more seals to block flow of the third MR fluid 65 from the bearing 66. In addition, the inner race 67 and/or the outer race 68 may include a longitudinal retaining feature configured to block longitudinal movement of the third segment 44 relative to the shaft. While two bearings are employed in the illustrated embodiment, it should be appreciated that more or fewer bearings (e.g., 1, 2, 3, 4, 5, 6, or more) may be utilized in alternative embodiments. Furthermore, while protrusions/seals are employed for the first and second segments, and bearings are employed for the third segment, it should be appreciated that in alternative embodiments, bearings may be employed for the first and/or second segments, and/or protrusions/seals may be employed for the third segment.

In the illustrated embodiment, the clutch assembly 50 includes multiple magnetic field sources each configured to apply a respective magnetic field to the MR fluid associated with a corresponding meter roller segment. Each magnetic field source is configured to selectively vary an effective magnitude of the respective magnetic field to control an effective viscosity of the MR fluid associated with the corresponding meter roller segment. As will be appreciated, each magnetic field source may include any suitable device configured to apply a variable magnetic field to the MR fluid. For example, in certain embodiments, the magnetic field source may include an electromagnet or a movable (e.g., via an electrical, pneumatic, or hydraulic actuator) permanent magnet, among other variable magnetic field sources. In certain embodiments, the magnetic field source may be incorporated within the structure surrounding the MR fluid, such as within the meter roller segment and/or within the shaft. In such embodiments, an electric current may be applied to the structure surrounding the MR fluid to control the effective viscosity of the MR fluid.

In the illustrated embodiment, the clutch assembly 50 includes a first magnetic field source 70 configured to apply a variable magnetic field to the first MR fluid 55, a second magnetic field source 72 configured to apply a variable magnetic field to the second MR fluid 60, and a third magnetic field source 74 configured to apply a variable magnetic field to the third MR fluid 65. As will be appreciated, the clutch assembly 50 may include more or fewer magnetic field sources based on the number of meter roller segments. For example, each magnetic field source may be configured to apply a magnetic field to each MR fluid (e.g., the MR fluid associated with each meter roller segment). Alternatively, each magnetic field source may be configured to apply a magnetic field to multiple MR fluids (e.g., MR fluids associated with multiple segments).

In the illustrated embodiment, each magnetic field source is communicatively coupled to a controller 76. In certain embodiments, the controller 76 is an electronic controller having electrical circuitry configured to process data from an input 78 (e.g., a user interface, an implement controller, etc.) and to output control signals to the magnetic field sources. In the illustrated embodiment, the controller 76 include a processor, such as the illustrated microprocessor 80, and a memory device 82. The controller 76 may also include one or more storage devices and/or other suitable components. The processor 80 may be used to execute software, such as software for controlling the magnetic field sources, and so forth. Moreover, the processor 80 may include multiple microprocessors, one or more "general-purpose" microprocessors, one or more special-purpose microprocessors, and/or one or more application specific integrated circuits (ASICS), or some combination thereof. For example, the processor 80 may include one or more reduced instruction set (RISC) processors.

The memory device 82 may include a volatile memory, such as random access memory (RAM), and/or a nonvolatile memory, such as ROM. The memory device 82 may store a variety of information and may be used for various purposes. For example, the memory device 82 may store processor-executable instructions (e.g., firmware or software) for the processor 80 to execute, such as instructions for controlling the magnetic field sources. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., position data, desired flow rate data, etc.), instructions (e.g., software or firmware for controlling the magnetic field sources, etc.), and any other suitable data.

The controller 76 is configured to independently control a rotation rate of each meter roller segment by controlling an output signal to each magnetic field source. By way of example, the first meter roller segment 40 may be configured to output agricultural product to row units on a left portion of an implement, the second meter roller segment 42 may be configured to output agricultural product to row units on a center portion of the implement, and the third meter roller segment 44 may be configured to output agricultural product to a right portion of the implement. During a left-hand turn, the center portion of the implement may have a higher ground speed than the left portion of the implement, and the right portion of the implement may have a higher ground speed than the center portion of the implement. Accordingly, it may be desirable for the row units of the center portion of the implement to deliver more agricultural product than the row units of the left portion of the implement. In addition, it may be desirable for the row units of the right portion of the implement to deliver more agricultural product than the row units of the center portion of the implement. In this manner, a desired quantity of agricultural product may be applied to the field.

To control the flow rate from the row units of each portion of the implement, the controller 76 may independently control the rotation rate of each meter roller. For example, the controller 76 may output a control signal (e.g., a continuous voltage, a PWM signal, etc.) indicative of a low effective magnitude (e.g., zero effective magnitude) magnetic field to the first magnetic field source 70. The first magnetic field source 70 may, in turn, apply a low effective magnitude (e.g., zero effective magnitude) magnetic field to the first MR fluid 55, thereby inducing the first MR fluid 55 to have a low effective viscosity. The low effective viscosity of the first MR fluid 55 establishes a weak coupling between the shaft 46 and the first meter roller segment 40. As a result, the first meter roller segment 40 rotates significantly slower than the shaft 46. For example, if the shaft 46 rotates at 100 rotations per minute (RPM), the first meter roller segment 40 may rotate at 20 RPM due to the weak coupling between the shaft 46 and the first meter roller segment 40. As a result, the first meter roller segment 40 may output agricultural product to the row units on the left portion of the implement at a low flow rate.

In addition, the controller 76 may output a control signal (e.g., a continuous voltage, a PWM signal, etc.) indicative of a medium effective magnitude magnetic field to the second magnetic field source 72. The second magnetic field source 72 may, in turn, apply a medium effective magnitude magnetic field to the second MR fluid 60, thereby inducing the second MR fluid 60 to have a medium effective viscosity. The medium effective viscosity of the second MR fluid 60 establishes a moderate coupling between the shaft 46 and the second meter roller segment 42. As a result, the second meter roller segment 42 rotates slower than the shaft 46. For example, if the shaft 46 rotates at 100 rotations per minute (RPM), the second meter roller segment 42 may rotate at 55 RPM due to the moderate coupling between the shaft 46 and the second meter roller segment 42. As a result, the second meter roller segment 42 may output agricultural product to the row units on the center portion of the implement at a medium flow rate.

Furthermore, the controller 76 may output a control signal (e.g., a continuous voltage, a PWM signal, etc.) indicative of a high effective magnitude magnetic field to the third magnetic field source 74. The third magnetic field source 74 may, in turn, apply a high effective magnitude magnetic field to the third MR fluid 65, thereby inducing the third MR fluid 65 to have a high effective viscosity. The high effective viscosity of the third MR fluid 65 establishes a strong coupling between the shaft 46 and the third meter roller segment 44. As a result, the third meter roller segment 44 rotates slightly slower than the shaft 46, or in certain embodiments, at the same speed as the shaft 46. For example, if the shaft 46 rotates at 100 rotations per minute (RPM), the third meter roller segment 44 may rotate at 90 RPM due to the strong coupling between the shaft 46 and the third meter roller segment 44. As a result, the third meter roller segment 44 may output agricultural product to the row units on the right portion of the implement at a high flow rate.

Because the rotation rate of each meter roller segment is at least partially dependent on the effective viscosity of the MR fluid, and the effective viscosity of the MR fluid is controllable based at least in part of the effective magnitude of the magnetic field applied to the MR fluid, the controller 76 may control each magnetic field source to establish a desired rotation rate of each meter roller segment. Accordingly, a desired flow rate of agricultural product may be output from the row units of each portion of the implement, thereby delivering a desired quantity of agricultural product to the field. While each meter roller segment is independently controllable in the illustrated embodiment, it should be appreciated that, in certain embodiments, multiple meter roller segments may be controlled by a single magnetic field source. Moreover, while the illustrated embodiment includes three meter roller segments, three MR fluids, and three magnetic field sources, it should be appreciate that alternative embodiments may include more or fewer meter roller segments, MR fluids, magnetic field sources, or a combination thereof.

In the illustrated embodiment, the agricultural metering system 18 includes a second clutch assembly 84 having a fourth MR fluid 86 disposed between the outer surface 54 of the shaft 46 and an inner surface 88 of a base 90. The rotation rotate of the shaft 46 relative to the base 90 is at least partially dependent on an effective viscosity of the fourth MR fluid 86, and the effective viscosity of the fourth MR fluid 86 is controllable based at least in part on an effective magnitude of a magnetic field applied to the fourth MR fluid 86. In the illustrated embodiment, the base 90 is configured to support the shaft 46. However, it should be appreciated that the base 90 may be any suitable structure that does not rotate with the shaft 46.

In the illustrated embodiment, the agricultural metering system 18 includes a fourth magnetic field source 92 configured to apply a magnetic field to the fourth MR fluid 86. As illustrated, the magnetic field source 92 is communicatively coupled to the controller 76. The controller 76 is configured to control the rotation rate of the shaft 46 by controlling an output signal (e.g., a continuous voltage, a PWM signal, etc.) to the fourth magnetic field source 92. For example, to reduce the rotation rate of the shaft 46, the controller 76 may output a control signal indicative of a high effective magnitude magnetic field to the fourth magnetic field source 92. The fourth magnetic field source 92 may, in turn, apply a high effective magnitude magnetic field to the fourth MR fluid 86, thereby inducing the fourth MR fluid 86 to have a high effective viscosity. The high effective viscosity of the fourth MR fluid 86 establishes high resistance to rotation of the shaft 46. As a result, the rotation rate of the shaft 46 relative to the base 90 is reduced.

Conversely, to increase the rotation rate of the shaft 46, the controller 76 may output a control signal (e.g., a continuous voltage, a PWM signal, etc.) indicative of a low effective magnitude (e.g., zero effective magnitude) magnetic field to the fourth magnetic field source 92. The fourth magnetic field source 92 may, in turn, apply a low effective magnitude (e.g., zero effective magnitude) magnetic field to the fourth MR fluid 86, thereby inducing the fourth MR fluid 86 to have a low effective viscosity. The low effective viscosity of the fourth MR fluid 86 establishes low resistance to rotation of the shaft 46. As a result, the rotation rate of the shaft 46 relative to the base 90 may be increased.

In the illustrated embodiment, the metering system 18 includes a third clutch assembly 94 (e.g., a torque converter, a mechanical clutch, etc.) operatively disposed between the shaft 46 and the drive system 48. For example, in the illustrated embodiment, an output shaft 96 of the drive system 48 and the shaft 46 are coupled to the clutch assembly 94. The third clutch assembly 94 is configured to selectively enable the shaft 46 to rotate at a slower rotation rate than a rotation rate of the drive system 48. Accordingly, as the second clutch assembly 84 induces the shaft 46 to rotate at a slower rotation rate, the rotation rate of the drive system 48 may remain constant. By controlling the rotation rate of the shaft 46, the overall flow rate of agricultural product to the row units may be controlled, in addition to independently controlling the agricultural product flow rate to row units on each portion of the implement.

In certain embodiments, the third clutch assembly 94 may be omitted. In such embodiments, the drive system 48 may be configured to automatically reduce the rotation rate of the shaft 46 (e.g., via an electronic control system) in response to increased rotational resistance generated by the second clutch assembly 84. In further embodiments, the second clutch assembly 84 and the third clutch assembly 94 may be omitted. In such embodiments, the drive system 48 may be communicatively coupled to the controller 76, and the controller 76 may be configured to control the rotation rate of the drive system 48 to establish the desired rotation rate of the shaft 46. Alternatively, the rotation rate of the drive system 48 and the shaft 46 may be constant, and the rotation rate of each meter roller segment may be controlled by the first clutch assembly 50 alone. In alternatively embodiments, the first clutch assembly 50 may be omitted, and the meter roller segments may be rigidly (e.g., non-rotatably) coupled to the shaft 46. In such embodiments, the rotation rate of the meter roller segments may be controlled by the second clutch assembly 86 alone.

Figure 4:
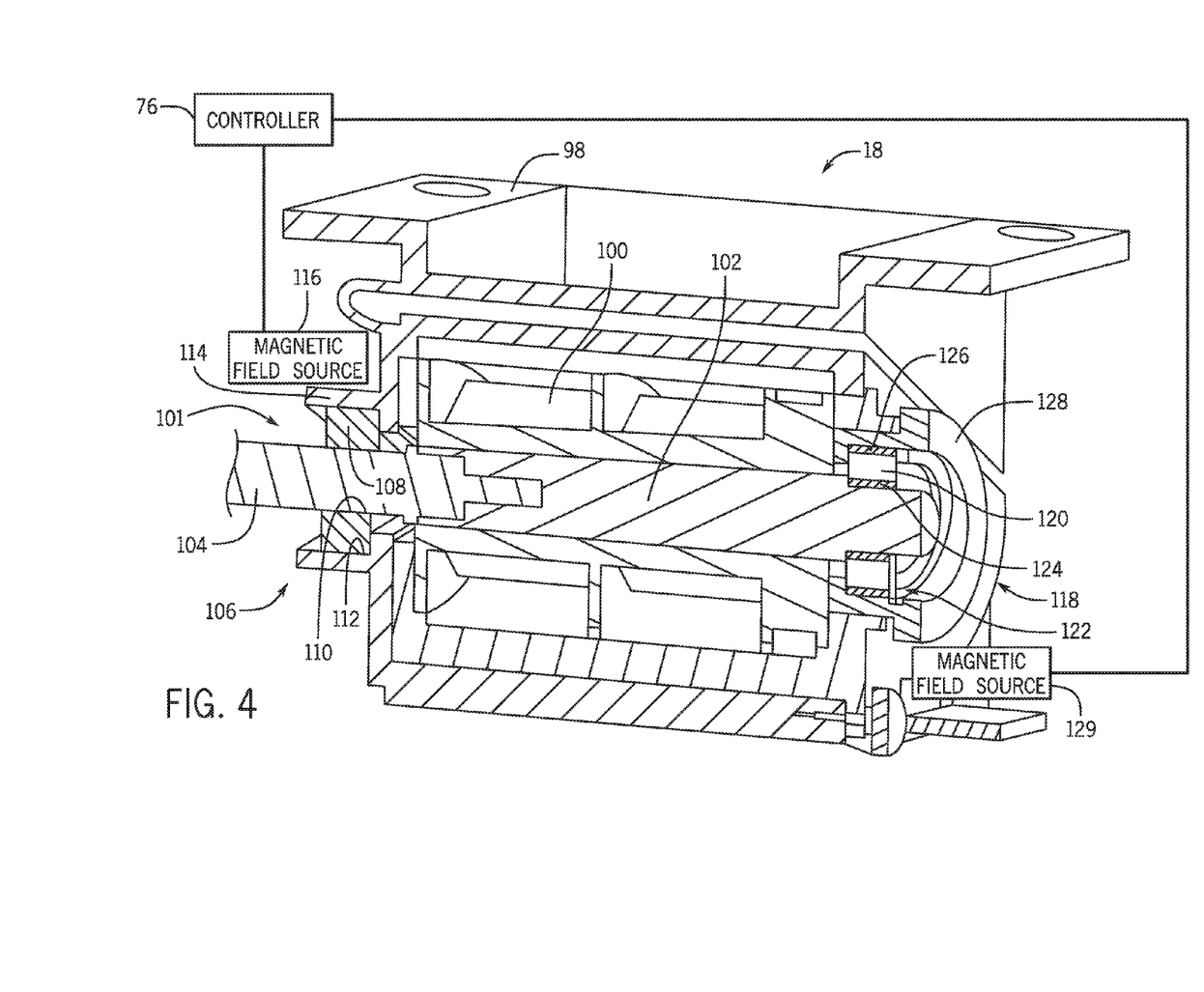
FIG. 4 is a cross-sectional view of a portion of an alternative embodiment of a metering system having an MR fluid clutch assembly.

FIG. 4 is a cross-sectional view of a portion of an alternative embodiment of a metering system 18 having an MR fluid clutch assembly. In the illustrated embodiment, the metering system 18 includes a meter box 98 and a meter roller 100 disposed within the meter box 98. In certain embodiments, an air cart may include multiple meter box/meter roller assemblies each configured to meter agricultural product to a respective group of row units on the implement (e.g., via a primary line, a header, secondary lines, etc.). In such embodiments, each meter roller may be driven to rotate by a respective drive system, or the meter rollers may be driven to rotate by a common drive system.

In the illustrated embodiment, the meter roller 100 is rigidly (e.g., non-rotatably) coupled to a shaft 101, which in the illustrated embodiment, includes a driven shaft 102 and a drive shaft 104 rigidly (e.g., non-rotatably) coupled to the driven shaft 102. However, it should be appreciated that, in alternative embodiments, the shaft 101 may be a single-piece shaft. In certain embodiments, the shaft 101 is coupled to a clutch assembly configured to selectively enable the shaft 101 to rotate at a slower rotation rate than the rotation rotate of the drive system. Alternatively, the shaft 101 may be directly coupled to the drive system. In the illustrated embodiment, the metering system 18 includes a first clutch assembly 106 having a first MR fluid 108 disposed between an outer surface 110 of the shaft 101 and an inner surface 112 of a base 114 of the meter box 98. The rotation rate of the shaft 101 relative to the base 114 is at least partially dependent on an effective viscosity of the first MR fluid 108, and the effective viscosity of the first MR fluid 108 is controllable based at least in part on an effective magnitude of a magnetic field applied to the first MR fluid 108.

In the illustrated embodiment, the agricultural metering system 18 includes a first magnetic field source 116 configured to apply a magnetic field to the first MR fluid 108. As illustrated, the magnetic field source 116 is communicatively coupled to the controller 76. The controller 76 is configured to control the rotation rate of the shaft 101, and thus the meter roller 100, by providing an output signal (e.g., a continuous voltage, a PWM signal, etc.) to the first magnetic field source 116. For example, to reduce the rotation rate of the meter roller 100, the controller 76 may output a control signal indicative of a high effective magnitude magnetic field to the first magnetic field source 116. The first magnetic field source 116 may, in turn, apply a high effective magnitude magnetic field to the first MR fluid 108, thereby inducing the first MR fluid 108 to have a high effective viscosity. The high effective viscosity of the first MR fluid 108 establishes high resistance to rotation of the shaft 101. As a result, the rotation rate of the meter roller 100 is reduced.

Conversely, to increase the rotation rate of the meter roller 100, the controller 76 may output a control signal (e.g., a continuous voltage, a PWM signal, etc.) indicative of a low effective magnitude (e.g., zero effective magnitude) magnetic field to the first magnetic field source 116. The first magnetic field source 116 may, in turn, apply a low effective magnitude (e.g., zero effective magnitude) magnetic field to the first MR fluid 108, thereby inducing the first MR fluid 108 to have a low effective viscosity. The low effective viscosity of the first MR fluid 108 establishes low resistance to rotation of the shaft 101. As a result, the rotation rate of the meter roller 100 may be increased.

In the illustrated embodiment, the metering system 18 includes a second clutch assembly 118 having a second MR fluid 120 and a bearing 122. As illustrated, an inner race 124 of the bearing 122 is rigidly (e.g., non-rotatably) coupled to the shaft 101, and an outer race 126 of the bearing 122 is rigidly (e.g., non-rotatably) coupled to a cap 128 (e.g., base), which in turn, is rigidly (e.g., non-rotatably) coupled to the meter box 98. Furthermore, the second MR fluid 120 is disposed between the inner race 124 and the outer race 126. The rotation rate of the shaft 101 relative to the cap 128 is at least partially dependent on an effective viscosity of the second MR fluid 120, and the effective viscosity of the second MR fluid 120 is controllable based at least in part on an effective magnitude of a magnetic field applied to the second MR fluid 120.

In the illustrated embodiment, the agricultural metering system 18 includes a second magnetic field source 129 configured to apply a magnetic field to the second MR fluid 120. As illustrated, the magnetic field source 129 is communicatively coupled to the controller 76. The controller 76 is configured to control the rotation rate of the shaft 101, and thus the meter roller 100, by providing an output signal (e.g., a continuous voltage, a PWM signal, etc.) to the second magnetic field source 129. For example, to reduce the rotation rate of the meter roller 100, the controller 76 may output a control signal indicative of a high effective magnitude magnetic field to the second magnetic field source 129. The second magnetic field source 129 may, in turn, apply a high effective magnitude magnetic field to the second MR fluid 120, thereby inducing the second MR fluid 120 to have a high effective viscosity. The high effective viscosity of the second MR fluid 120 establishes high resistance to rotation of the shaft 101. As a result, the rotation rate of the meter roller 100 is reduced.

Conversely, to increase the rotation rate of the meter roller 100, the controller 76 may output a control signal (e.g., a continuous voltage, a PWM signal, etc.) indicative of a low effective magnitude (e.g., zero effective magnitude) magnetic field to the second magnetic field source 129. The second magnetic field source 129 may, in turn, apply a low effective magnitude (e.g., zero effective magnitude) magnetic field to the second MR fluid 120, thereby inducing the second MR fluid 120 to have a low effective viscosity. The low effective viscosity of the second MR fluid 120 establishes low resistance to rotation of the shaft 101. As a result, the rotation rate of the meter roller may be increased.

In certain embodiments, the second clutch assembly 118 may be omitted, and the rotation rate of the meter roller 100 may be controlled by the first clutch assembly 106 alone. In further embodiments, the first clutch assembly 106 may be omitted, and the rotation rate of the meter roller 100 may be controlled by the second clutch assembly 118 alone. Furthermore, in the illustrated embodiment, the first and second clutch assemblies may both function to control the rotation rate of the meter roller 100 (e.g., via the controller 76 coordinating output signals to the first and second magnetic field sources). In addition, the metering system 18 may include a clutch assembly similar to the third clutch assembly 94 of the embodiments described above with reference to FIG. 3. In such embodiments, the clutch assembly may be configured to selectively enable the shaft 101 to rotate at a slower rotation rate than a rotation rate of the drive system. Accordingly, as the first and/or second clutch assemblies induce the shaft 101 to rotate at a slower rotation rate, the rotation rate of the drive system may remain constant. By controlling the rotation rate of the shaft 101, the flow rate of agricultural product from the meter roller 100 may be controlled, thereby providing the row units downstream from the meter roller 100 with a desired flow rate of the agricultural product.

While the illustrated embodiments include a single controller, it should be appreciated that in certain embodiments, the agricultural metering system may include multiple controllers. For example, in certain embodiments, the agricultural metering system may include a metering controller and magnetic field source controllers. In such embodiments, a magnetic field source controller may be communicatively coupled to each magnetic field source, and each magnetic field source controller may be communicatively coupled to the metering controller, thereby forming a control system. To control the rotation rate of a object associated with a respective magnetic field source (e.g., shaft, meter roller segment, etc.), the metering controller may output a first control signal indicative of a target rotation rate of the object to a respective magnetic field source controller. The respective magnetic field source controller may then determine an effective viscosity of the respective MR fluid sufficient to establish the target rotation rate and an effective magnitude of a magnetic field sufficient to establish the effective viscosity. Once the effective magnitude is determined, the respective magnetic field source controller may output a second control signal (e.g., a continuous voltage, a PWM signal, etc.) indicative of the effective magnitude of the magnetic field to the respective magnetic field source.

In certain embodiments, one or more magnetic field sources may be integrated into certain components of the agricultural metering system. For example, a signal (e.g., electric current) may be applied to the shaft 46 or to a magnetic field source imbedded within the shaft to establish a magnetic field. Furthermore, a signal (e.g., electric current) may be applied to one or more meter roller segments 40, 42, 44, to the base 90, to the driven shaft 102, to the drive shaft 104, to the base 114, to the cap 128, to the bearing 122 (e.g., to the inner race 124 and/or to the outer race 126), to magnetic field source(s) imbedded within one or more of the respective components, or a combination thereof, to establish a magnetic field. In such configurations, the controller/control system may be communicatively coupled to each component and/or magnetic field source configured to emit a magnetic field, thereby facilitating control of the viscosity of respective MR fluid(s).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural metering system, comprising:
a meter roller having a plurality of flutes and a corresponding plurality of recesses, wherein the meter roller is configured to meter product from an agricultural product storage compartment to a product distribution system via rotation of the meter roller;
a shaft configured to drive the meter roller to rotate;
a first clutch assembly operatively coupled to the meter roller, wherein the first clutch assembly comprises a first magnetorheological (MR) fluid, the first MR fluid is disposed between an inner surface of the meter roller and an outer surface of the shaft, a rotation rate of the meter roller is at least partially dependent on an effective viscosity of the first MR fluid, and the effective viscosity of the first MR fluid is controllable based at least in part on an effective magnitude of a first magnetic field applied to the first MR fluid; and
a second clutch assembly having a second MR fluid disposed between the outer surface of the shaft and an inner surface of a base, wherein a rotation rate of the shaft relative to the base is at least partially dependent on an effective viscosity of the second MR fluid, and the effective viscosity of the second MR fluid is controllable based at least in part on an effective magnitude of a second magnetic field applied to the second MR fluid.

2. The agricultural metering system of claim 1, wherein the first clutch assembly comprises a magnetic field source configured to apply the first magnetic field to the first MR fluid, and the magnetic field source is configured to selectively vary the effective magnitude of the first magnetic field to control the effective viscosity of the first MR fluid.

3. The agricultural metering system of claim 1, wherein the meter roller comprises a plurality of meter roller segments, and at least two meter roller segments of the plurality of meter roller segments are independently rotatable relative to one another.

4. The agricultural metering system of claim 3, comprising at least one seal configured to block the first MR fluid associated with a first meter roller segment of the plurality of meter roller segments from flowing into the first MR fluid associated with a second meter roller segment of the plurality of meter roller segments, adjacent to the first meter roller segment.

5. The agricultural metering system of claim 3, wherein the first clutch assembly comprises a plurality of magnetic field sources each configured to apply a respective magnetic field to the first MR fluid associated with a respective meter roller segment of the plurality of meter roller segments, and each magnetic field source of the plurality of magnetic field sources is configured to selectively vary an effective magnitude of the respective magnetic field to control the effective viscosity of the first MR fluid associated with the respective meter roller segment.

6. The agricultural metering system of claim 1, wherein the second clutch assembly comprises a bearing having an inner race non-rotatably coupled to the shaft and an outer race non-rotatably coupled to the base, and the second MR fluid is disposed between the inner race and the outer race.

7. The agricultural metering system of claim 1, comprising a third clutch assembly operatively disposed between the shaft and a drive system, wherein the third clutch assembly is configured to selectively enable the shaft to rotate at a slower rotation rate than a rotation rate of the drive system.

8. An agricultural metering system, comprising:
a meter roller having a plurality of flutes and a corresponding plurality of recesses, wherein the meter roller is configured to meter product from an agricultural product storage compartment to a product distribution system via rotation of the meter roller;
a shaft configured to drive the meter roller to rotate, wherein the shaft is configured to rotate relative to a base;
a first clutch assembly comprising a magnetorheological (MR) fluid disposed between an outer surface of the shaft and an inner surface of the base, wherein a rotation rate of the shaft is at least partially dependent on an effective viscosity of the MR fluid, and the effective viscosity of the MR fluid is controllable based at least in part on an effective magnitude of a magnetic field applied to the MR fluid; and
a second clutch assembly operatively disposed between the shaft and a drive system, wherein the second clutch assembly is configured to selectively enable the shaft to rotate at a slower rotation rate than a rotation rate of the drive system.

9. The agricultural metering system of claim 8, wherein the first clutch assembly comprises a magnetic field source configured to apply the magnetic field to the MR fluid, and the magnetic field source is configured to selectively vary the effective magnitude of the magnetic field to control the effective viscosity of the MR fluid.

10. The agricultural metering system of claim 8, wherein the first clutch assembly comprises a bearing having an inner race non-rotatably coupled to the shaft and an outer race non-rotatably coupled to the base, and the MR fluid is disposed between the inner race and the outer race.

11. The agricultural metering system of claim 8, comprising a third clutch assembly having a second MR fluid disposed between an inner surface of the meter roller and the outer surface of the shaft, wherein a rotation rate of the meter roller relative to the shaft is at least partially dependent on an effective viscosity of the second MR fluid, and the effective viscosity of the second MR fluid is controllable based at least in part on an effective magnitude of a second magnetic field applied to the second MR fluid.

* * * * *